(12) United States Patent
Hammack et al.

(10) Patent No.: US 9,032,319 B1
(45) Date of Patent: May 12, 2015

(54) METHODS, SYSTEMS, AND APPARATUS FOR HANDLING OF FLIGHT DECK DATA

(75) Inventors: Jason L. Hammack, Seattle, WA (US); Victor A. Riley, Point Roberts, WA (US)

(73) Assignee: The Boeing Company, Chicago, IL (US)

( * ) Notice: Subject to any disclaimer, the term of this patent is extended or adjusted under 35 U.S.C. 154(b) by 71 days.

(21) Appl. No.: 13/425,498

(22) Filed: Mar. 21, 2012

Related U.S. Application Data

(60) Provisional application No. 61/467,176, filed on Mar. 24, 2011.

(51) Int. Cl.
*G06F 3/0481* (2013.01)
*G06F 3/0486* (2013.01)
*G06F 17/24* (2006.01)
*G06F 9/44* (2006.01)
*G06F 17/21* (2006.01)
*G06F 9/54* (2006.01)

(52) U.S. Cl.
CPC .............. *G06F 3/0481* (2013.01); *G06F 17/24* (2013.01); *G06F 3/0486* (2013.01); *G06F 9/4443* (2013.01); *G06F 17/211* (2013.01); *G06F 9/543* (2013.01)

(58) Field of Classification Search
CPC ................ G06F 3/016; G06F 3/048–3/04897; G06F 11/30; G06F 11/3013; G06F 11/0736; G06F 11/0739; G06F 3/0481; G06F 3/0486; G06F 9/543; G06F 9/4443; G06F 17/24; G06F 17/211
USPC ................................... 715/769, 770, 856–859
See application file for complete search history.

(56) References Cited

U.S. PATENT DOCUMENTS

| | | | |
|---|---|---|---|
| 5,715,163 A | 2/1998 | Bang et al. | |
| 5,745,910 A * | 4/1998 | Piersol et al. | 715/210 |
| 5,978,715 A | 11/1999 | Briffe et al. | |
| 6,522,958 B1 * | 2/2003 | Dwyer et al. | 701/3 |
| 6,542,796 B1 * | 4/2003 | Gibbs et al. | 701/3 |
| 6,633,810 B1 | 10/2003 | Qureshi et al. | |
| 7,188,007 B2 | 3/2007 | Boorman et al. | |
| 7,203,577 B2 | 4/2007 | Gunn et al. | |
| 7,256,710 B2 | 8/2007 | Mumaw et al. | |
| 7,321,318 B2 | 1/2008 | Crane et al. | |
| 7,418,319 B2 | 8/2008 | Chen et al. | |
| 7,460,029 B2 | 12/2008 | Boorman et al. | |
| 7,565,618 B2 * | 7/2009 | Sheasby et al. | 715/769 |
| 7,751,947 B2 | 7/2010 | Gunn et al. | |
| 7,751,948 B2 | 7/2010 | Boorman et al. | |
| 7,983,450 B2 | 7/2011 | Higgins et al. | |

(Continued)

*Primary Examiner* — Kieu Vu
*Assistant Examiner* — Shangao Zhang
(74) *Attorney, Agent, or Firm* — The Boeing Company; Brook Assefa

(57) ABSTRACT

Methods, systems, and apparatus for handling of flight deck data are disclosed. The disclosed flight deck data handling means including means such as a cursor-based and touch screen-based means that attach a representative state of the data under pilot manipulation in one or more of the following locations: (1) at the origin display location of the handled data; (2) at the target display location of the handled data; and (3) at any point from the origin to the destination display locations that a cursor or touch input traverses. The representative state of the data is shown via a context-sensitive repeater coupled to a cursor and touch inputs such that continuous feedback as to the current state of the pilot's data manipulation is maintained.

19 Claims, 14 Drawing Sheets

(56) References Cited

U.S. PATENT DOCUMENTS

| | | |
|---|---|---|
| 8,082,070 B2 | 12/2011 | Gunn et al. |
| 2005/0114778 A1* | 5/2005 | Branson et al. ............... 715/711 |
| 2005/0228674 A1* | 10/2005 | Gunn et al. ................... 704/270 |
| 2006/0070007 A1* | 3/2006 | Cummins et al. ............. 715/769 |
| 2007/0300159 A1* | 12/2007 | Kordun ......................... 715/733 |
| 2009/0007012 A1* | 1/2009 | Mandic et al. ................ 715/810 |
| 2010/0146425 A1* | 6/2010 | Lance et al. .................. 715/769 |
| 2011/0208696 A1* | 8/2011 | Pang ............................. 707/610 |

* cited by examiner

US 9,032,319 B1

METHODS, SYSTEMS, AND APPARATUS FOR HANDLING OF FLIGHT DECK DATA

RELATED PROVISIONAL APPLICATION

This application is related to and claims the benefit of priority of provisional U.S. Patent Application Ser. No. 61/467,176, filed Mar. 24, 2011, entitled "Flight Deck Data Handling Indicator", which is incorporated herein in its entirety by reference.

TECHNICAL FIELD

Aspects of the present disclosure are directed to methods, systems, and devices for handling flight crew data input at an aircraft cockpit (flight deck).

BACKGROUND

Pilots (flight crew) of modern commercial aircraft aviate, navigate, and communicate utilizing computer systems and associated cockpit interfaces used for managing, organizing, and simplifying the pilots' workload.

Generally, the management of information related to the flight entails utilizing a number of means for acquiring, utilizing, and redirecting graphical, aural, and textual information to and from the airplane's systems. For example, such means may include a number of cockpit (flight deck) displays, control panels, keyboard devices, cursor control devices, touch screen devices, and voice/audio systems. However, as many of these devices are used for multiple and sometimes coupled or associated functions, optimizing each user interface for each cockpit function poses a manifold challenge.

One facet of this challenge is to provide continuous feedback as to the current state of a pilot's data manipulation. Other related facets of the challenge include but are not limited to increasing pilot familiarity, increasing proficiency, reducing the need for recall, and reducing the need for retraining.

For example, in a cockpit with a display-based operator interface, transferring data from one position on the system's display such as a Control Display Unit (CDU) to another position on the system's display is a common task. In most computer interfaces, the information being transferred is held in a temporary memory location, often known as the "clipboard", which may or may not be visible. It is also a generalized function that is not customized to a task at hand such as, for example, tasks related to programming a flight management computer to affect the flight plan or performance of an airplane. If the operator is interrupted between the original selection or manipulation of the data to be transferred and the selection of the position (destination) to transfer the data, the operator may forget the nature of the data under manipulation, its intended destination, or the current step in the data handling process.

With respect to cockpit systems, for example, data to be transferred from one display location or field to another are sometimes contained in a "scratchpad", which is a special data entry field that serves as a central or common location for myriad data to be handled by the pilots. Subsequent to entry on the scratchpad, task interruptions may impart additional workload to pilots when attempting to recall or find out the state of the data handling or data transfer task associated with the scratchpad data.

Thus, there is a need for a method, system, and device that improves access, visibility, and handling aspects of cockpit data management.

SUMMARY

One way of meeting this need is by an enhanced data handling methods, systems, and devices that maintain access and visibility of the current data state to pilots.

The present disclosure addresses this need by data handling means including means such as a cursor-based and touch screen-based means that attach a representative state of the data under pilot manipulation in one or more of the following locations: (1) at the origin display location of the handled data; (2) at the target display location of the handled data; and (3) at any point from the origin to the destination display locations that a cursor or touch input traverses. The representative state of the data is shown via a context-sensitive repeater coupled to a cursor and/or touch inputs such that continuous feedback as to the current state of the pilot's data manipulation is maintained.

An embodiment of the disclosure comprises cockpit data handling device operatively coupled to an aircraft display comprising means for loading a text string into memory from an origin display location for operator handling; means for displaying a representative state of the text string under operator handling proximate to a cursor; and means for transferring the text string to a second display location.

A cockpit data handling system operatively coupled to an aircraft display, comprises: a cursor-control device coupled to an aircraft display; a repeater coupled to a cursor of the cursor control device, wherein the repeater displays a representative state of a text string under operator handling; an activator for transferring the text string to a target display location.

A method of handling data on an aircraft flight deck system comprises: responsive to a first operator input, loading a text string into memory from an origin display location; displaying a representative state of the text string at a repeater proximate to a cursor location; responsive to a second operator input or a system input, displaying instructions associated with the text string at the repeater proximate to the cursor location; and responsive to a third operator input or a system input, transferring the text string to the target display location.

Another embodiment of the disclosure comprises a non-transitory computer readable medium containing instructions for handling data at an aircraft display by a method comprising: accepting a text string for storage in memory; storing the text string in memory; displaying the text string at a repeater coupled to a cursor of a cursor control device, wherein the repeater displays a representative state of the stored text string; displaying the text string at a target display location in preview mode when the cursor is positioned within the target display location; and responsive to an operator input or a system input, transferring the text string to the target display location in permanent mode.

It should be appreciated that this Summary is provided to introduce selected aspects of the disclosure in a simplified form that are further described below in the Detailed Description. This Summary is not intended to be used to limit the scope of the claimed subject matter. Other aspects and features of the present disclosure, as defined solely by the claims, will become apparent to those ordinarily skilled in the art upon review of the following non-limited detailed description of the disclosure in conjunction with the accompanying figures.

DETAILED DESCRIPTION

The following disclosure describes methods, systems, and devices for a flight deck data handling indicator. Certain specific details are set forth in the following description and the figures to provide a thorough understanding of the various embodiments of the disclosure. Well-known structures, systems, and methods often associated with aircraft control, display, and flight management systems have not been shown or described to avoid unnecessarily obscuring the description of the various embodiments of the disclosure. In addition, those of ordinary skill in the relevant art will understand that the additional embodiments of the present disclosure may be practiced without several of the details described below.

Many embodiments of the disclosure described below may take the form of computer-executable instructions, such as routines executed by a programmable computer. Those skilled in the relevant art will appreciate that the invention can be practiced on other computer system configurations as well. The disclosure can be embodied in a special-purpose computer or data processor that is specifically programmed, configured, or constructed to perform one or more of the computer-executable instructions described below. Accordingly, the term "computer" as generally used herein refers to any data processor that can be engaged in a cockpit, including computers for cockpit display systems, Flight Management Computers (FMC), Control Display Units (CDU), Flight Control Computers (FCC), Electronic Flight Bags (EFB), laptops, tablet computers, or other hand-held devices.

The disclosure can also be practiced in distributed computing environments, in which tasks or modules are performed via remote processing devices that are linked through a communication network such as those enabled via datalink by the aircraft communication systems. In a distributed computing environment, program modules or subroutines may be located in both local and remote memory storage devices. Aspects of the disclosure described below may be stored or distributed on computer-readable media, including magnetic or optically readable computer disks (e.g., removable disks), as well as distributed electronically over networks. Data structures and transmission of data particular to aspects of the disclosure are also encompassed within the scope of the disclosure. Information handled in accordance with aspects of the disclosure can be presented on displays or display media, for example, CRT screens, LCD screens, head-up displays, or other suitable devices.

Figure 1:
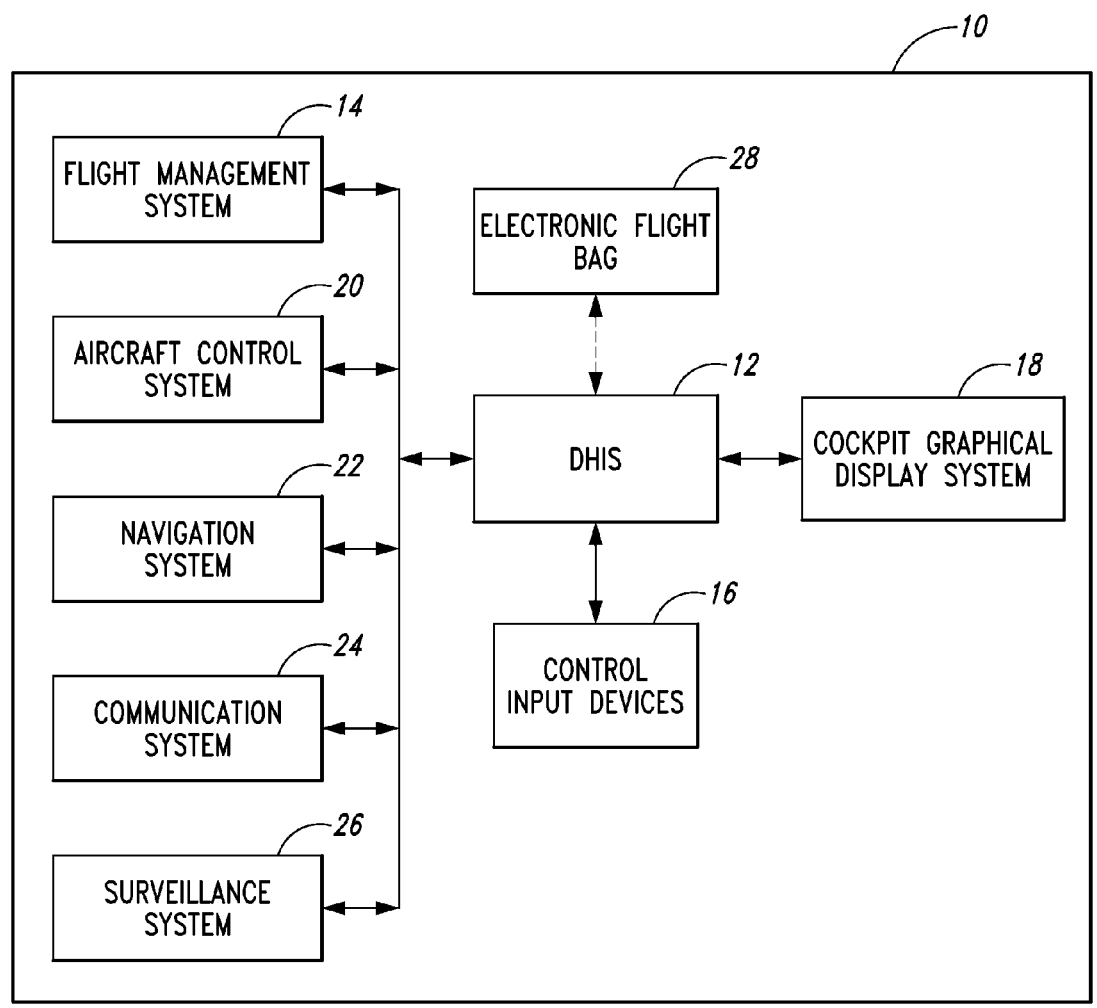
FIG. 1 is a schematic diagram of a generalized aircraft systems architecture centered on a Data Handling Indicator System (DHIS).
Figure 4:
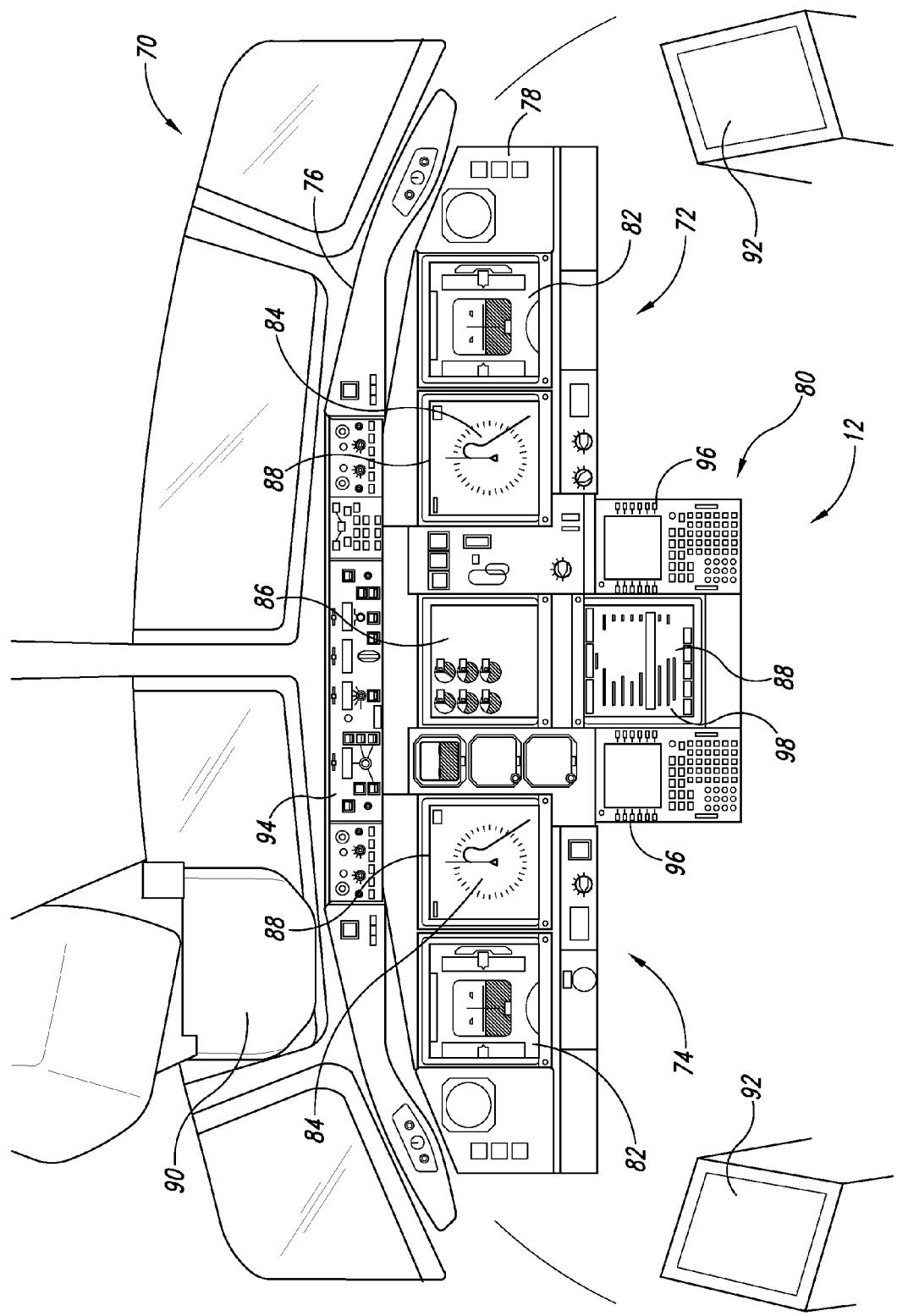
FIG. 4 is a diagram illustrating a more detailed arrangement of cockpit instruments that enable an advantageous embodiment according to the disclosure.

For example, pilots generally utilize the Flight Management System (FMS) 14 shown in FIG. 1, which typically may entail a Flight Management Computer (FMC) (not shown) and a (multi-function) Control Display Unit (CDU) 96, shown in FIG. 4, for managing the (a) flight planning, (b) navigation, (c) performance, (d) guidance, and (e) datalink communication aspects of their flight. This entails, among others, planning, entering, and activating aspects of their flight for each phase of flight including taxi, take-off, climb, cruise, descent, approach, and landing.

With respect to flight guidance, pilots may utilize both the FMS 14 and the Mode Control Panel (MCP) 94, shown in FIG. 4, to manage aspects such as the lateral path, the vertical profile, and the speed profile of the aircraft's flight. Input for managing these aspects may be made, for example among others, via the CDU 96, the MCP 94, or other interactive means such as touch-screen or cursor-control devices. The flight guidance input may be used to control the autopilot and related systems such as flight director systems, flight control computers, and autothrottle system that may in turn send commands to other airplane systems such as the engines and flight control systems to direct and control the airplane consistent with the pilots' commands.

Lastly, information pertinent to the aforementioned aspects (a)-(e) above may be displayed in a number of display locations on the aircraft such as the Primary Flight Displays (PFD) 82, Navigation Displays (ND) 84, Mode Control Panels (MCP) 94, Control Display Units (CDU) 96, and Crew Alerting Displays 86 as shown in FIG. 4. This information may include, for example but not limited to, pilot-entered data, uplinked data, stored data from navigation databases (NDB) or Aerodynamic and Engine databases (AEDB), and actual data as processed or calculated for the current flight.

In executing their tasks related to aviating, navigating, and communicating, pilots utilize computer systems and associated cockpit interfaces such as those described above for managing, organizing, and simplifying their workload. Generally, the management of information related to the current and/or planned phases of flight, such as but not limited to information affecting the airplane's flight path and performance, entails a number of means for acquiring, utilizing, and redirecting graphical, aural, and textual information to and from the airplane's systems. For example, such means may include a number of cockpit (flight deck) displays, control panels, keyboard devices, cursor control devices, touch screen devices, and voice/audio systems. However, as many of these devices are used for multiple and sometimes coupled or associated functions, optimizing each operator interface for each cockpit function poses a manifold challenge.

One facet of this challenge is to provide continuous feedback as to the current state of a pilot's data manipulation. Other related facets of the challenge include but are not limited to increasing pilot familiarity, increasing proficiency, reducing the need for recall, and reducing the need for retraining.

For example, in a cockpit with a display-based operator interface, transferring data from one position on the system's display such as a Control Display Unit (CDU) to another position on the system's display is a common task. In most computer interfaces, the information being transferred is held in a temporary memory location, often known as the "clipboard", which may or may not be visible. It is also a generalized function that is not customized to a task at hand such as, for example, tasks related to programming a flight management computer to affect the flight plan or performance of an airplane. If the operator is interrupted between the original selection or manipulation of the data to be transferred and the selection of the position (destination) to transfer the data, the operator may forget the nature of the data under manipulation, its intended destination, or the current step in the data handling process.

Figure 5:
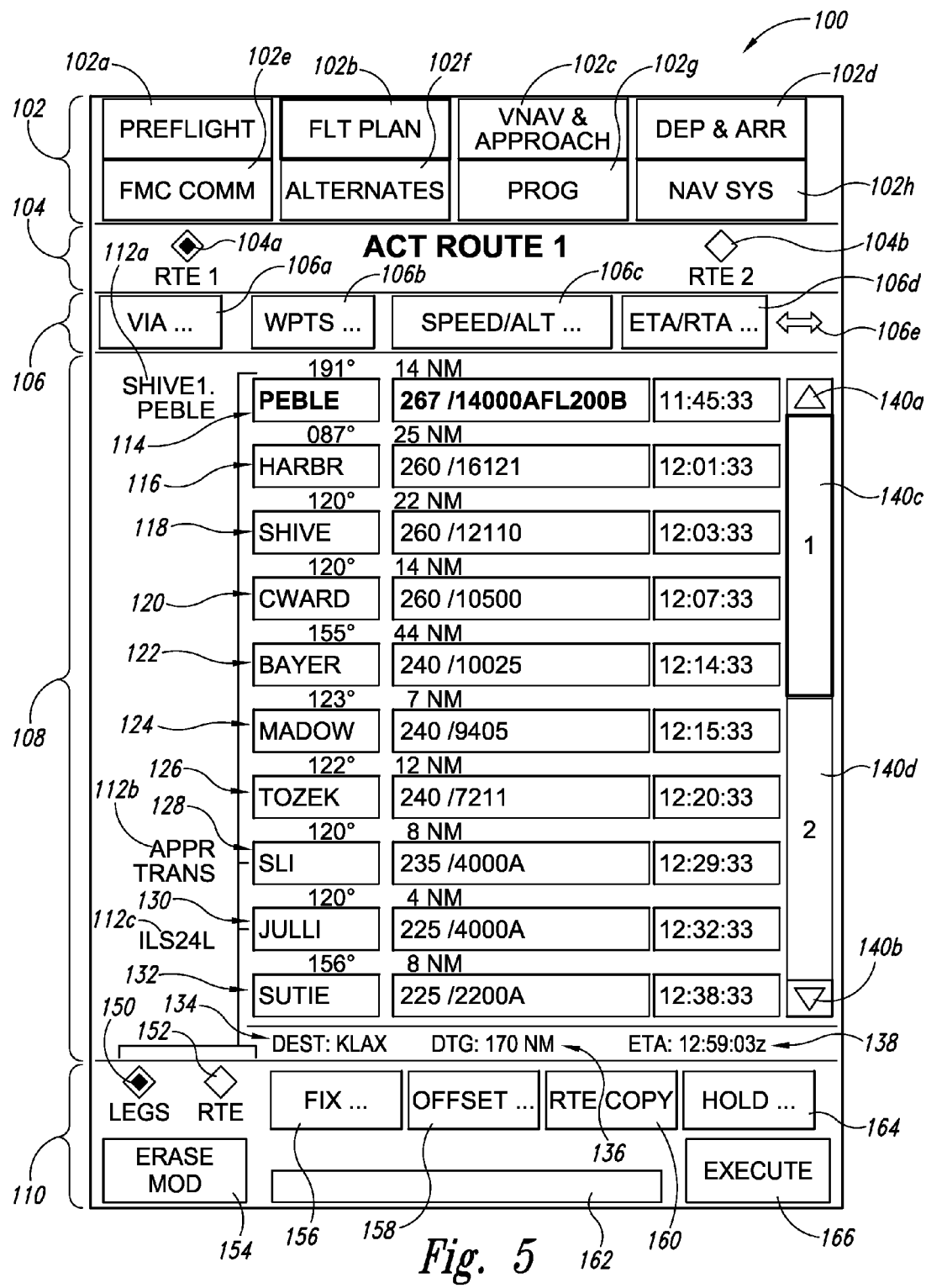
FIG. 5 depicts a graphical flight plan page.

With respect to cockpit systems, for example, data to be transferred from one display location or field to another are sometimes contained in a "scratchpad" 16, shown in FIG. 5, which is a special data entry field that serves as a central or common location for myriad data to be handled by the pilots. Subsequent to entry on the scratchpad 162, task interruptions may impart additional workload to pilots when attempting to recall or find out the state of the data handling or data transfer task associated with the scratchpad data.

Thus, there is a need for a method, system, and device that improves access, visibility, and handling aspects of cockpit data management. The extent to which pilot interactions with and feedback from an airplane's systems are optimized has a direct impact on reducing pilot workload, improving pilot efficiency, improving crew awareness, reducing head-down time, reducing the risk of error and confusion, and reducing training time.

One way of meeting this need is by an enhanced data handling methods, systems, and devices that maintain access and visibility of the current data state to pilots. The present disclosure addresses this need by data handling means including means such as a cursor-based and touch screen-based means that attach a representative state of the data under pilot manipulation in one or more of the following locations: (1) at the origin display location of the handled data; (2) at the target display location of the handled data; and (3) at any point from the origin to the destination display locations that a cursor or touch input traverses. The representative state of the data is shown via a context-sensitive repeater coupled to a cursor and touch inputs such that continuous feedback as to the current state of the pilot's data manipulation is maintained.

Data handling means may be implemented as part of Control Input Devices 16. Control Input Devices 16 may be embodied as a dedicated control panel or as part of another Control Input Device 16 on the airplane. For example, and without limitation, such devices may be integrated as part of the CDU 96 or multi-function CDU (MCDU), or as part of another control panel for controlling flight management, navigation, communication, or display aspects of the aircraft's systems. Further, Control Input Devices 16 may include, without limitation, one or more of voice command input means, keyboards, keypads, cursor control devices, touch-screen input and line select keys (LSK) or other keys on a CDU 96 or a control panel.

Control Input Devices 16 are provided to perform cockpit tasks such as programming, selecting, entering, accepting, and utilizing cockpit information that is generated by the pilots or is available from, without limitation, a communications uplink from Air Traffic Control (ATC) or an Airline Operational Center (AOC) through the aircraft communication system such as Aircraft Communications Addressing and Reporting System (AGARS), a paper chart, customized airline-specific approach procedure database, or other on-board aircraft systems such as the flight control system, the FMS, the navigation system or subsystems thereof, or the surveillance system or subsystems thereof. Lastly, the Control Input Devices 16 may also be utilized in a manner generally similar to that described in U.S. Pat. No. 7,418,319, entitled "Systems and Methods for Handling the Display and Receipt of Aircraft Control Information" and incorporated herein in its entirety by reference.

This detailed description utilizes non-limiting examples of flight management functions to which the data handling means of this disclosure may be applied. The term "flight management function" (or FM function) in the context of this disclosure includes any operator-activatable display element that a pilot may select to activate and/or modify an FM function by changing a value associated with the selected FM function. A flight management function may be represented, for example and without limitation, as an operator-activatable graphical symbol, icon, button, or an alphanumeric text string signifying an aspect of a function, for example and without limitation, related to a flight plan, route procedures, speed schedules or associated indices, parameters, or values. Flight management tasks are tasks that pilots may need to perform in managing their flight such as but not limited to making progress reports, managing datalink communications, or preparing/programming for upcoming cockpit tasks. A flight management task may entail working with one or more flight management functions.

Figure 6:
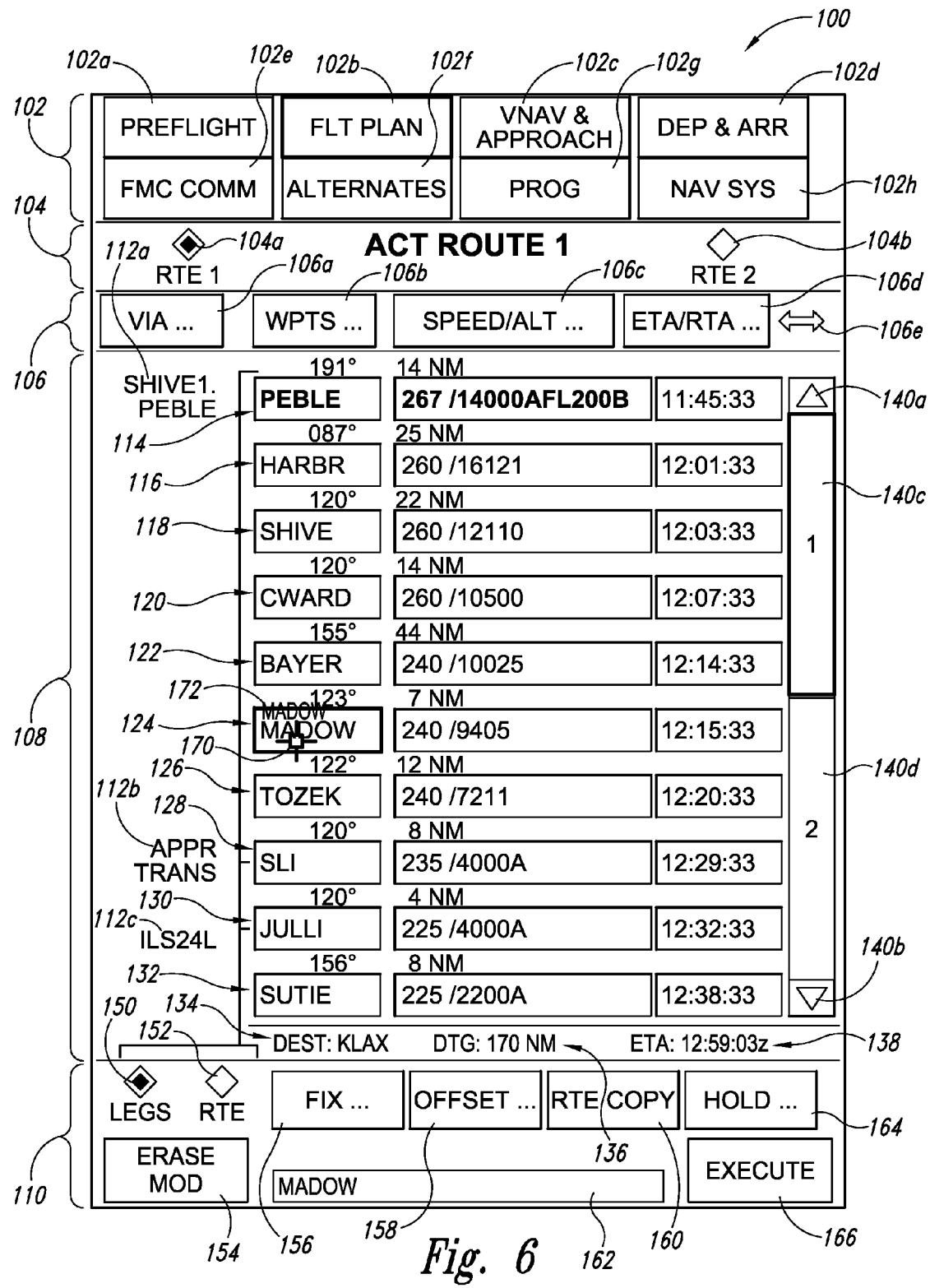
FIG. 6 shows a graphical flight plan page upon waypoint selection.

An embodiment of data handling means of the DHIS 12 of this disclosure may have a first element that is a repeater 172, shown in FIG. 6, entailing a text string that appears over or proximate to a cursor 170, also shown in FIG. 6, when the operator either types the text into the scratchpad 162 or selects data from a first (origin) display location such as a data field, icon, or button. More generally, means for loading a text string into memory to cause the text string to appear at the repeater may entail the use of, for example, and without limitation, one or more of voice command input means, keyboards, keypads, cursor control devices, touch-screen input, line select keys (LSK), or other keys such as keys on a CDU 96 or a control panel. In addition to typing and selection operations, the repeater 172 may also function with operations such as cutting, copying, or pasting text strings. In one embodiment, the repeater's 172 text string appears directly over the cursor 170 and follows the cursor 170 wherever it is positioned on the display.

In another distinct embodiment, the repeater's 172 text string may disappear when the cursor 170 is positioned outside of the valid entry space for that data, and then reappear when the cursor 170 is positioned back into the valid area. For example, if the repeater's 172 text string is related to a waypoint identifier but the cursor 170 is positioned outside a valid entry space for waypoints, and instead is positioned under the speed plan column 106c of FIG. 6, the text string may disappear. In yet further distinct embodiments, the repeater's 172 text string may be removed, and in its place, an assistance or instructional message may be displayed whenever the cursor 170 or touch input is positioned outside a valid entry space or field thereby providing an assistance message to the pilot before an invalid or erroneous step to transfer the text string to an invalid entry space is attempted. Such assistance or instructional messages, for example and without limitation, may be adapted from or incorporated in a manner generally similar to that described in U.S. Pat. No. 7,751,947, entitled "Methods and Systems for Displaying Assistance Messages to Aircraft Operators" and incorporated herein in its entirety by reference.

An embodiment of data handling means of the DHIS 12 this disclosure may have a second element that provides a preview function, which temporarily shows the data under manipulation in its new location prior to the pilot selecting or committing the data to the new location. In this embodiment, when the operator makes the cursor 170 hover over a data field, the content of that field switches to a preview of the new data, shown in a different text color, text size, and/or text font to indicate that it is displayed in temporary or preview mode. For example, moving the cursor 170 in and out of the boundaries of the data field will cause the preview data to show when the cursor 170 is over the field and the existing prior data to show when the cursor 170 is outside of the field.

The preview function may also be implemented to work on a touch screen device with touch input and without a cursor. In this embodiment, the data prepared to be placed into a target location would show as a temporary entry in the target data field (display location) when the operator touches the target data field and leaves the finger in the field. If the operator then slides the finger off the field to cancel the entry, the field would return to its previous state and the data to be placed would remain in its waiting (temporary) state, available for entry into a different display location. However, if the operator lifts his or her finger from the data field while the preview data is showing, the data is entered into the target data field.

Lastly, an embodiment of data handling means of the DHIS 12 this disclosure may have a third element that transfers or activates the text string at the target display location. This activator element, or more generally means for activating or transferring the text string to the target display location in a permanent (non-preview) mode, may be implemented, for example and without limitation, with hardware or software of cockpit systems and devices that process input from one or more of voice command input means, keyboards, keypads, cursor control devices, touch-screen input, line select keys (LSK), or other keys such as keys on a CDU 96 or a control panel. The permanent (non-preview) mode of the text string is shown in a different text color, text size, and/or text font from the preview mode to better indicate to the pilots the current phase of the data handling step.

The activator element of the DHIS 12 may also perform functions such as system checks of the text string under handling prior to activating or transferring the text string to the target display location. System checks and functions may include checks for text string syntax, function-specific checks for errors, or other features that impart context-sensitive capabilities further described below. Responsive to such system checks of the text string, the activator may indicate one or more target display locations to which the text string may be transferred.

Before turning to the figures, it may be helpful to note that the display elements described below and in the figures may be further coded by color, shape, dynamic characteristics, or other visual attributes and potentially accompanied by aural tones or annunciations depending on the critical nature of the information. Furthermore, the data presented in the figures are provided by the way of example only and should not be construed as limiting. Lastly, any combination or sub-combination of graphical elements provided in this disclosure may be available for display; the combinations provided in figures are provided by the way of example and not limitation.

Turning now to a more detailed discussion of the disclosure and the figures, FIG. 1 depicts an embodiment of a generalized aircraft systems architecture 10 centered on a Data Handling Indicator System (DHIS) 12. FIG. 1 has been simplified in order to make it easier to understand the present disclosure. Those skilled in the art will appreciate that FIG. 1 is one configuration of many that can be implemented for an embodiment of a DHIS 12. For example, and without limitation, the DHIS 12 can be hosted on a number of on-board computers or devices suitable for the airplane configuration at hand such as a dedicated DHIS computer (not shown) that is not part of the Flight Management System (FMS) 14 or its components, a Flight Management System (FMS) 14, a Control Display Unit (CDU) 96, or a cockpit graphical display system (CGDS) 18, which typically comprises at least a graphics display computer (not shown) and a graphics display (not shown). More generally, the DHIS 12, or its modular equivalent, may be incorporated into any cockpit system that has a user interface entailing a display and means for interacting with display elements. Thus, the DHIS 12 may be implemented in a manner similar to that disclosed above to avail pilots means for loading text strings, means for displaying loaded text strings at a repeater or in preview mode, and means for activating or transferring text to a target display location such that continuous visual feedback as to the current state of the data handling operation is provided. With respect to displays, in various embodiments as shown in FIG. 4, an aircraft cockpit 70 and the airplane's cockpit graphical display system 18 may include at least one of a Primary Fight Display (PFD) 82, a Navigation Display (ND) 84, a Head-Up Display (HUD) 90, a Multi-Function Display (MFD) 88, a Crew Alerting Display 86, and an Electronic Flight Bag (EFB) display 92, or other displays in the cockpit, a number of which may be configured to host the DHIS 12.

As shown in FIG. 1, a DHIS 12 is provided to enable interaction between pilots and various airplane systems. The DHIS 12 may be coupled or connected to the interfacing systems of FIG. 1. In some embodiments, the term "coupled" may be used to indicate that two or more components are in either direct or indirect (i.e., with an intervening component between them) physical, electrical, communicative (e.g., wireless connection), or logical contact with each other or that two or more elements co-operate or interact with each other. Similarly, the term "connected" may be used to indicate that two or more components are in direct physical, electrical, or communicative contact with each other.

The DHIS 12 is used to manage data handling when the pilots modify, change, or update data directed to systems shown in FIG. 1 to affect flight operating parameters of the airplane such as speed, thrust, altitude, performance or other aspects related to lateral and vertical navigation. In this regard, the Aircraft Control System 20 (components of the aircraft flight control system not shown) provides real-time flight operating parameter-related information from flight control computers, autopilot and autothrust systems, and selected flight control inputs on the Mode Control Panel (MCP) 94 (shown in FIG. 4). It also receives flight operating parameter commands or settings from the DHIS 12, the MCP 94, or other systems and directs them to its component systems, such as for example, the autothrottle and engines, to affect the flight of the airplane in real-time or at a later point in the flight.

Figure 2:
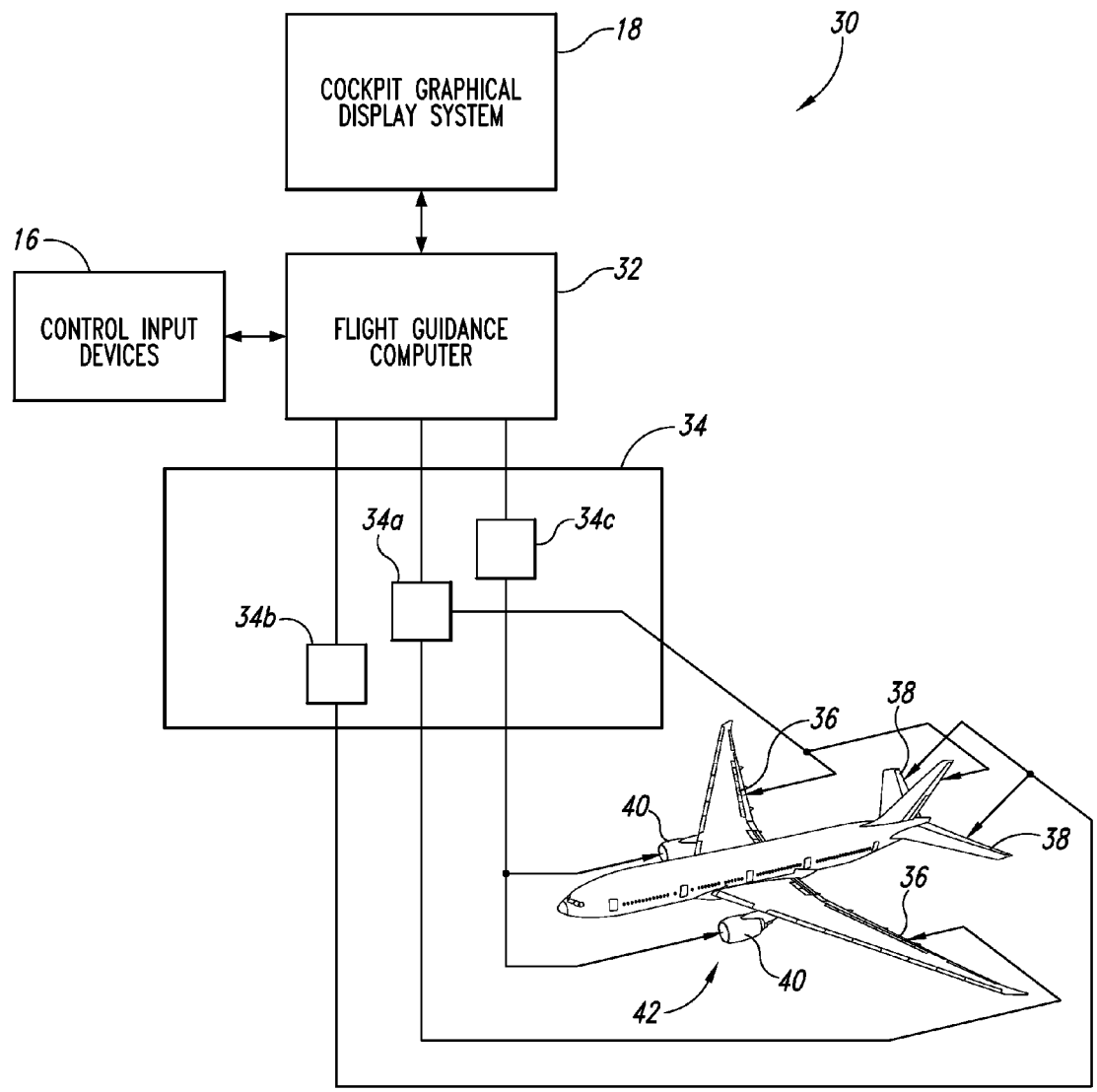
FIG. 2 is an example of an aircraft control architecture that can be manipulated by the data handling features of the DHIS.

Aspects of the flight control system have been described in further detail previously, an example of which may be found in U.S. Pat. No. 7,460,029, entitled "Systems and Methods for Presenting and Obtaining Flight Control Information". For example, as shown in FIG. 2, a flight guidance system 30 that is an embodiment of Aircraft Control System 20 connected to a DHIS 12, may entail display devices such as a Cockpit Graphical Display System 18 or other annunciators (not shown), Control Input Devices 16, a flight guidance computer 32, linked to one or more control systems 34, shown as a lateral/directional motion or roll/yaw control system 34a, a vertical motion or pitch control system 34b, and an airspeed (or autothrottle/engine) control system 34c. The lateral/directional control system 34a can be coupled to flight control surfaces affecting lateral and directional control 36, which are typically ailerons and/or rudders of the airplane 42. The vertical motion control system 34b can be coupled to pitch control surfaces 38, which are typically the aircraft's elevators. Lastly, the airspeed controller 34c can be coupled to the engines 40 of the airplane 42 in some path-based modes of operation, and can be coupled to the elevators in some climb and descent modes of operation. Pilots, for example, may interact with the Aircraft Control System 20, utilizing data handling capabilities provided by the DHIS 12 to program, modify, and execute FM functions displayed on the interface such as changing speed to affect the speed profile of the airplane; changing altitude to affect the vertical flight profile; or changing waypoints to change the lateral flight path of their airplane in real-time or program the change to execute at a later point in time.

Returning to FIG. 1, the Flight Management System (FMS) 14, and its Navigation database (NDB) (not shown) and Aerodynamic and Engine (performance) database (AEDB) (not shown) provide information necessary for navigation along the four-dimensional (4D, including time) flight route for calculating the optimal or desired performance for that flight route. The FMS 14 and its lateral and vertical navigation guidance functions may also utilize information from Navigation System 22, Communication System 24, and Aircraft Flight Control System 20 and display flight management information on a Cockpit Graphical Display System (CGDS) 18.

The Communications System 24 may also be enabled to uplink and downlink information, for example and without limitation, related to flight plans, Air Traffic Control (ATC) instructions for lateral navigation; vertical navigation; speed changes; required time of arrival at a waypoint or required time of arrival at a destination; weather; or Airline Operational Control (AOC) messages such as those related to gate information and updated time of arrival. It may also be engaged in transmitting and receiving coordination messages between aircraft that are engaged in a collaborative Air Traffic Management (ATM) application such as where one aircraft is asked to follow another aircraft at certain distance, time, speed and/or altitude parameters.

Another important system in managing FM functions is the airplane's Navigation System 22. Its component systems such as the Global Positioning System (GPS), Distance Measuring Equipment (DME), VHF Omni-Directional Range (VOR), Air Data and Inertial Reference Unit (ADIRU), Air Traffic Control (ATC) Transponders, Traffic Alert and Collision Avoidance System (TCAS) and/or other traffic computers used for Air Traffic Management (ATM) applications provide FM function-related information as related to, for example and without limitation, the navigation or guidance performance of the aircraft in reference to its flight plan, a navigation station or waypoint, or to some objective as set forth by a procedure such as a Continuous Descent Approach (CDA) or a collaborative Air Traffic Management (ATM) application. In this regard, certain ATM applications may be available as part of the Surveillance System 26. Alternative configurations may also embody ATM applications and certain navigation information in a suitably equipped Electronic Flight Bag (EFB) 28 that may incorporate DHIS 12 capabilities.

In addition, Control Input Devices 16 are provided to enter, accept, and utilize FM function-related information that is available from, without limitation, a communications uplink from Air Traffic Control (ATC) or an Airline Operational Center (AOC) through the Communication System 24, a paper chart, customized airline-specific approach procedure database, or other on-board aircraft systems such as the Aircraft Control System 20, the Flight Management System 14, the Navigation System 22, or the Surveillance System 26. The Control Input Devices 16 may also be utilized to interact with the information displayed on DHIS 12 enabled cockpit displays in a manner generally similar to that described in U.S. Pat. No. 7,418,319, entitled "Systems and Methods for Handling the Display and Receipt of Aircraft Control Information" and incorporated herein in its entirety by reference.

Lastly, the Control Input Devices 16 may be embodied as a dedicated control panel or as part of another control input device on the airplane. For example, and without limitation, the device 16 may be integrated as part of the Control Display Unit (CDU) 96, or as part of another control panel for controlling flight management, navigation or display aspects of the aircraft's systems. Further, the devices 16 may include, without limitation, means known to those skilled in the relevant art such as voice command input, keyboard, cursor control devices, touch-screen input and line select keys (LSK) or other keys on a CDU 96.

The above detailed descriptions of FIGS. 1 and 2 are intended to describe one embodiment but not the only embodiment of this disclosure, and in no way limit the scope of the disclosure. While the components of the systems such as those depicted in FIG. 1 can be designed to interact with each other in a variety of ways, they must in the end be helpful to the pilot in managing the flight of the airplane. The capabilities provided by DHIS 12 are configured to improve access, visibility, and data handling aspects of cockpit data management.

Figure 3:
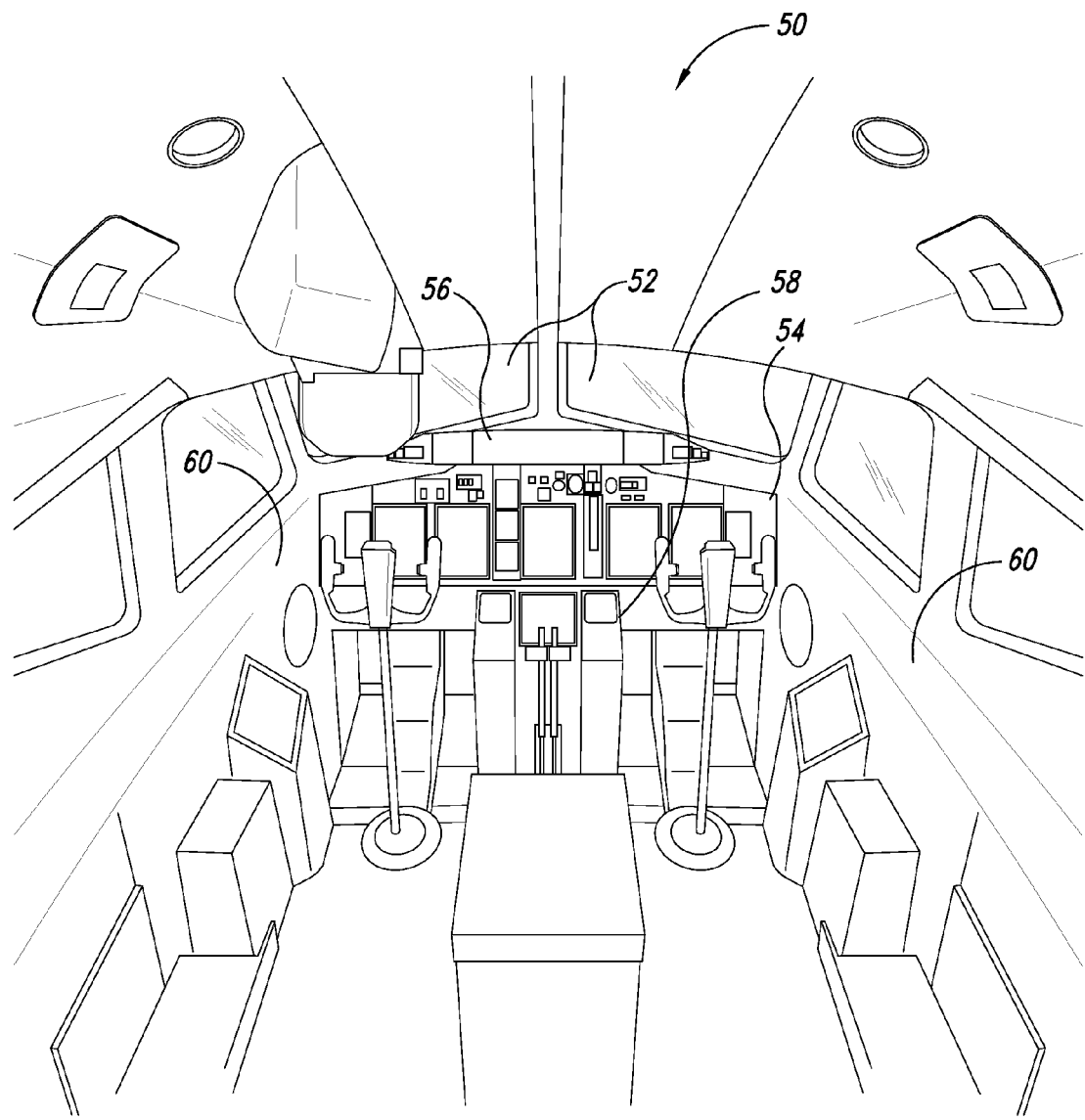
FIG. 3 is a diagram illustrating a general arrangement of an aircraft cockpit.

FIG. 3 illustrates a general arrangement of an aircraft cockpit 50 showing a layout of many of the aircraft systems that interact with, or potentially host, the DHIS 12, which are shown in further detail in FIG. 4. The cockpit 50 includes forward windows 52 a plurality of flight instruments on the forward instrument panel 54, a glare shield 56, a control pedestal 58, and sidewalls 60.

FIG. 4 shows a close-up view of the cockpit 70 with a glare shield 76, a forward instrument panel 78, and a control pedestal (also known as a center aislestand) 80 with various instruments 72 and displays 74. The forward instrument panel 78 and the control pedestal 80 have a number of displays, including multifunction displays 88. As shown here, the multifunction displays 88 include a Navigation Display 84 and a Checklist Display 98. The multifunction display 88 on the control pedestal 80 may also be configured to manage datalink communications or other cockpit functions. In addition, the cockpit has a Head-up Display 90 (an optional, second Head-up display is not shown), a Control Display Unit (CDU) 96, and an Electronic Flight Bag display 92. All of the aforementioned systems, which in display-oriented functional aspects may be part of the Cockpit Graphical Display System 18, can potentially be used in displaying or hosting some or all aspects of DHIS 12.

Lastly, a Mode Control Panel (MCP) 94 is positioned on the glare shield 76. The MCP 94 along with the CDU 96 and multifunction displays 88 with interactive capability may be capable of controlling or modifying inputs that influence the flight plan and performance of the airplane.

Turning now to a more detailed discussion of the disclosure and the figures, FIG. 5 depicts an embodiment of a graphical flight plan page. The graphical flight plan page shows, among other things, the route procedure, list of waypoints (WPTS column), SPEED/ALT restrictions, estimated/required time of arrival (ETA/RTA), and a scratchpad at the bottom of the page. As shown in FIG. 5, the data handling activity has not yet started.

As FIG. 5 is substantially repeated in FIGS. 6-10, it may be helpful to describe its elements in further detail. The display 100 is divided into display portions 102, 104, 106, 108 and 110. The first display portion 102 is configured to provide a set of display page selectors for FM functions associated with preflight 102a, flight plan 102b, vertical navigation and approach 102c, departure and arrivals 102d, datalink communications 102e, alternates and diversions 102f, progress 102g, and navigation systems 102h pages.

The second display portion 104 shows the name or title of the displayed data, which in this case is ACT ROUTE 1, as also indicated by the selected radio button for the selected route 104a. Radio button for route 2 104b is shown as not selected.

The third display portion 106 provides a set of column headers for route plans 106a, waypoints 106b, speed/altitude plan 106c, and estimated/required time of arrival 106d, as well as an access icon 106e to access additional columns of the page.

The fourth display portion 108 entails the flight plan elements, which are known to those skilled in the relevant art. For example, shown in display portion 108 are route procedures 112a-112c. Also shown are rows 114, 116, 118, 120, 122, 124, 126, 128, 130, and 132 entailing flight plan components such as waypoints and inbound bearing to the waypoints under the WPTS column 106b; speed and altitude information under SPEED/ALT column 106c as well as distance to waypoint from either the current position or relative to the preceding waypoint; and time of arrival information under the ETA/RTA column 106d. Also included in the display portion 108 are destination indicator 134; distance to go indicator 136; estimated time of arrival at destination 138; access icons 140a-140b to access portions of the flight plan that are not currently displayed, and data portion indicators 140c and 140d.

Lastly, the fifth display portion 110 entails functions such as radio buttons for Legs 150 or Route Procedure 152; a button to erase flight plan pending modifications 154; fix functions 156; offset functions 158; route copy functions 160; scratchpad 162; hold functions 164; and execute functions 166.

It should be appreciated that one or more of the display elements shown in FIG. 5 are operator-activatable (i.e., pilot-activatable). A signal input by the pilot via Control Input Device 16 to activate the operator-activatable display element may, for example, include aligning a cursor or other control element with the operator-activatable element and entering a keystroke, cursor control device selector (such as a mouse button) click, or other appropriate signal applicable to the airplane configuration to copy, cut, paste, change, or update the displayed information. Optionally, operator-activatable display elements may include emulations of buttons or mechanical switches which appear on the display. Lastly, operator-activatable display elements may be configured and displayed in a manner different from non-activatable display elements.

FIG. 6 shows the pilot (operator) has selected the MADOW waypoint on row 124, causing the string "MADOW" to be entered into the scratchpad 162 at the bottom of the display. Furthermore, a copy of the string "MADOW" can be seen attached to the top of the cursor 170 at the repeater 172 location, still shown over the MADOW waypoint immediately after selection. In a preferred embodiment, the copy of the string "MADOW" at the repeater 172 will be displayed in a different color such as cyan.

Figure 7:
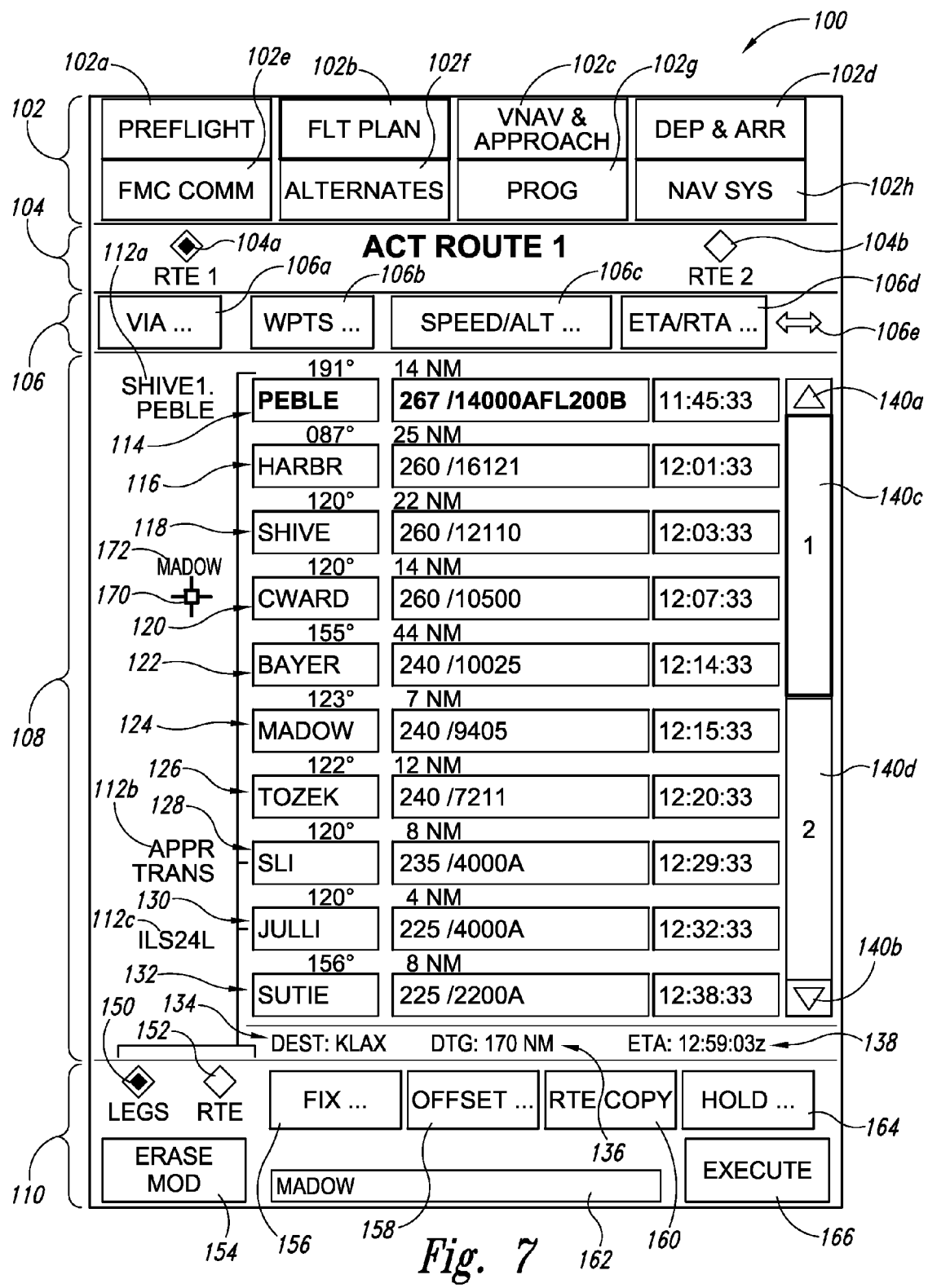
FIG. 7 depicts an interaction step where the selected waypoint is attached to the cursor and follows the cursor wherever it is positioned on the display.

FIG. 7 depicts an embodiment of an interaction step where the pilot has moved the cursor of the MADOW waypoint into an empty part of the display screen. The "MADOW" string is still positioned over the cursor 170 at the repeater 172 location. As the cursor 170 moves across the display, the character string stays remains displayed at the repeater 172.

Figure 8:
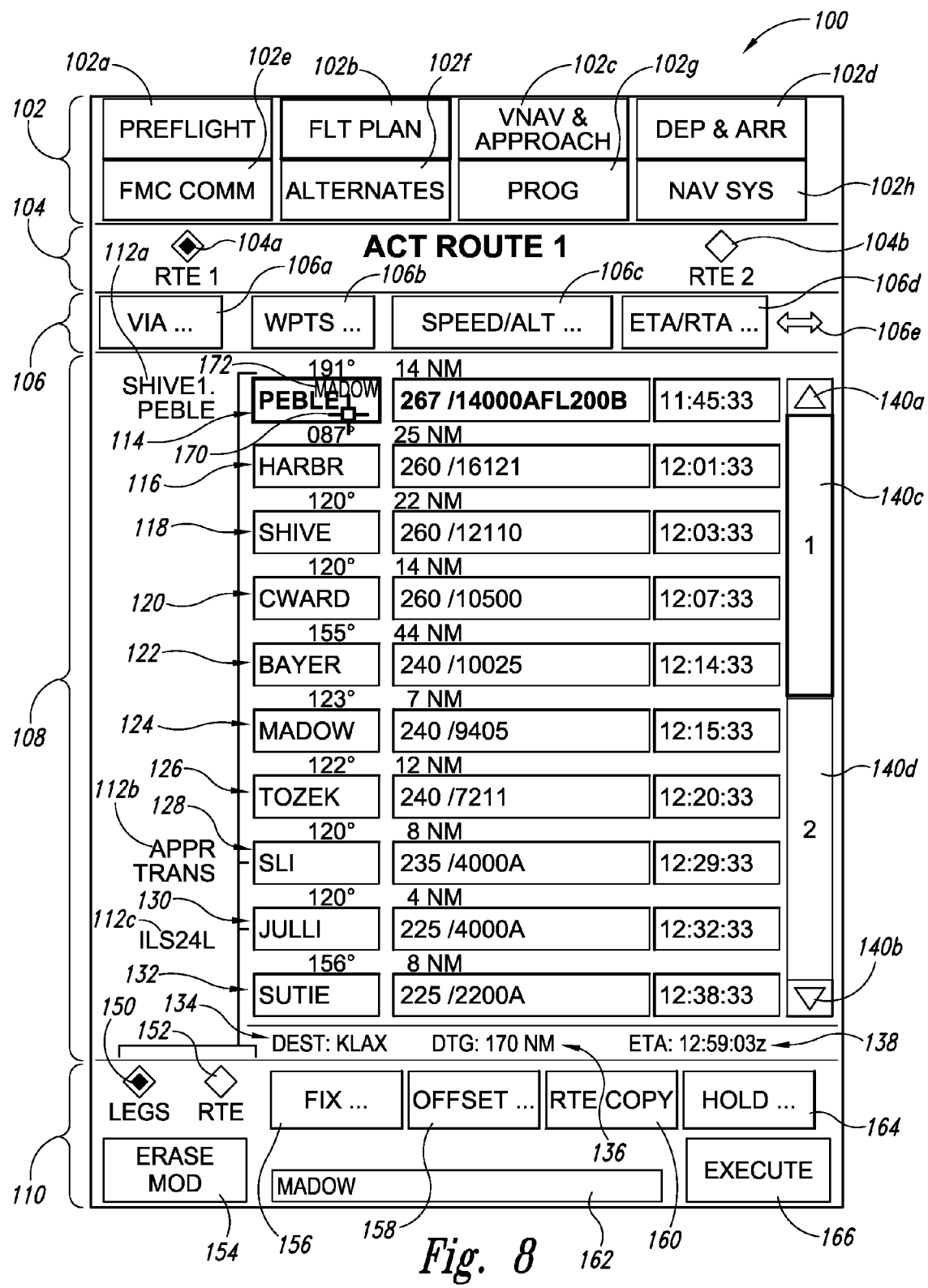
FIG. 8 depicts an interaction step prior to the selection of the destination data field.

Turning now to FIG. 8, depicted is a continuation of the interaction step where the pilot moves the cursor 170 to place the "MADOW" string into the first waypoint position in the flight plan at row 114. The cursor 170 is now positioned over the first waypoint button. In a preferred embodiment, the targeted waypoint button is highlighted with a magenta border to indicate that it is ready for selection.

Figure 9:
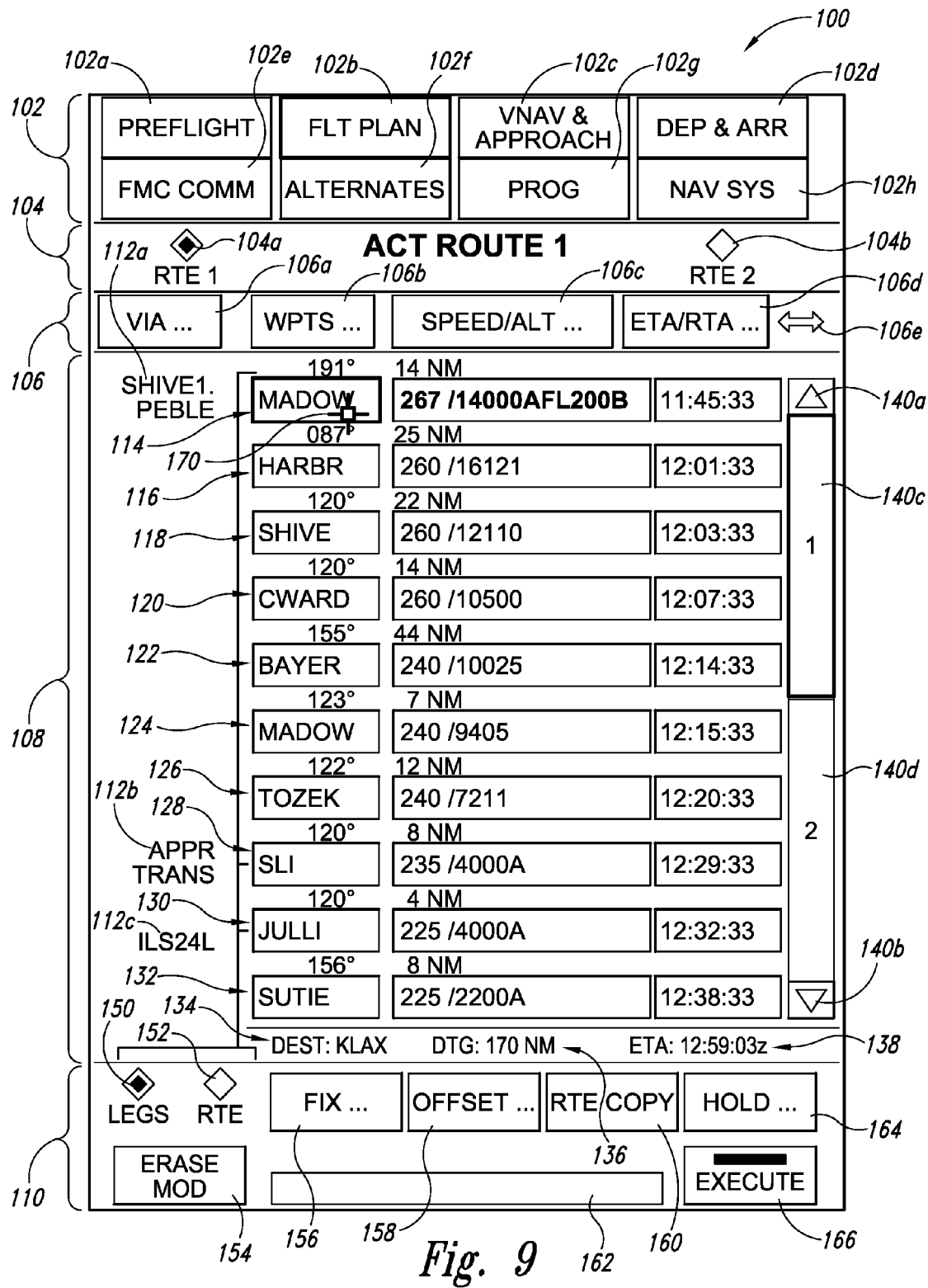
FIG. 9 illustrates an interaction step where the operator selects the destination data field.

FIG. 9 shows that, upon selection of the target destination (i.e., the waypoint button), the "MADOW" string that was positioned at the repeater 172 is entered into that field. At this step, the string "MADOW" is removed from the scratchpad 162 and the repeater 172. Because this action modifies the flight plan, the EXECUTE button becomes lit, as represented by the black bar above EXECUTE in FIG. 9, to indicate that the change is ready to be committed to update the flight plan. In addition, but not shown in the figures, when the waypoint MADOW is moved to the top, the entire list gets reconfigured to have waypoints MADOW, TOZEK, SLI, JULLI, and SUITE shift to the top, followed by more waypoints from the next page.

FIGS. 5-9 showed one embodiment of data handling interaction where the pilot manipulated the data string "MADOW" that was already on the page. In another distinct embodiment, the data handling means may also be used to pick up a data string as it is typed on the scratchpad.

Figure 10:
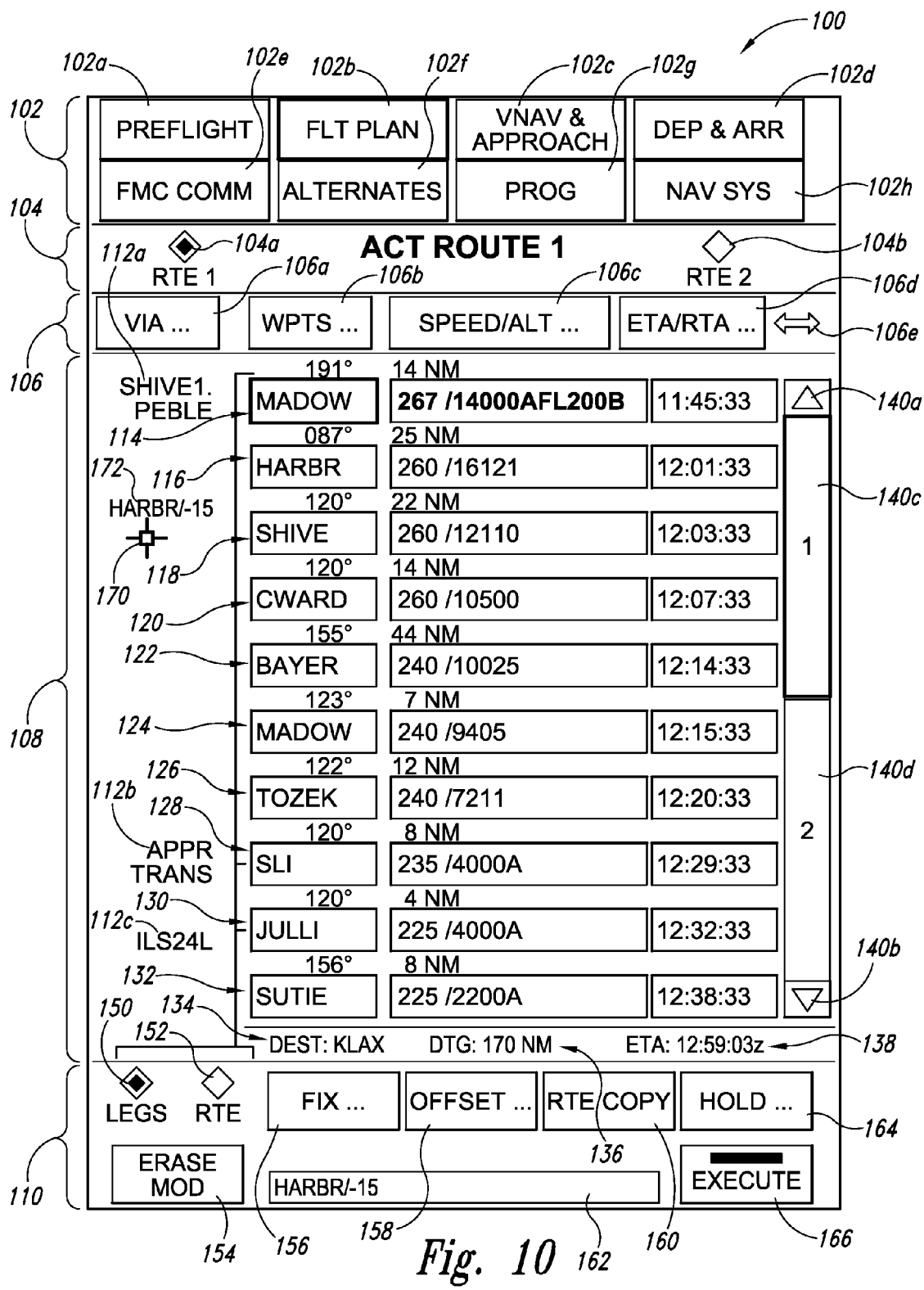
FIG. 10 depicts an embodiment of the invention where data entered into the scratchpad appears directly over the cursor.

FIG. 10 depicts an embodiment of the invention wherein, as the data string "HARBR/-15" is typed into the scratchpad 162, it also appears at the repeater 172 and moves with the cursor 170 as before. In one distinct embodiment, the data string may appear at the repeater 172 in real time or near real time. In another distinct embodiment, the data string may appear after the pilot completes entering the data string and signifies data entry completion via a pilot input such as a cursor control device click. Other means of attaching the data string to the cursor such as "click and drag" or automatic or pilot-controlled mode changes in the cursor control device to enable or disable data string attachment to the cursor 170 are also within the ambit of this disclosure. A pilot may then manipulate the cursor 170 and deposit the data string in substantially the same manner as discussed in the description of FIGS. 5-9.

Figure 11:
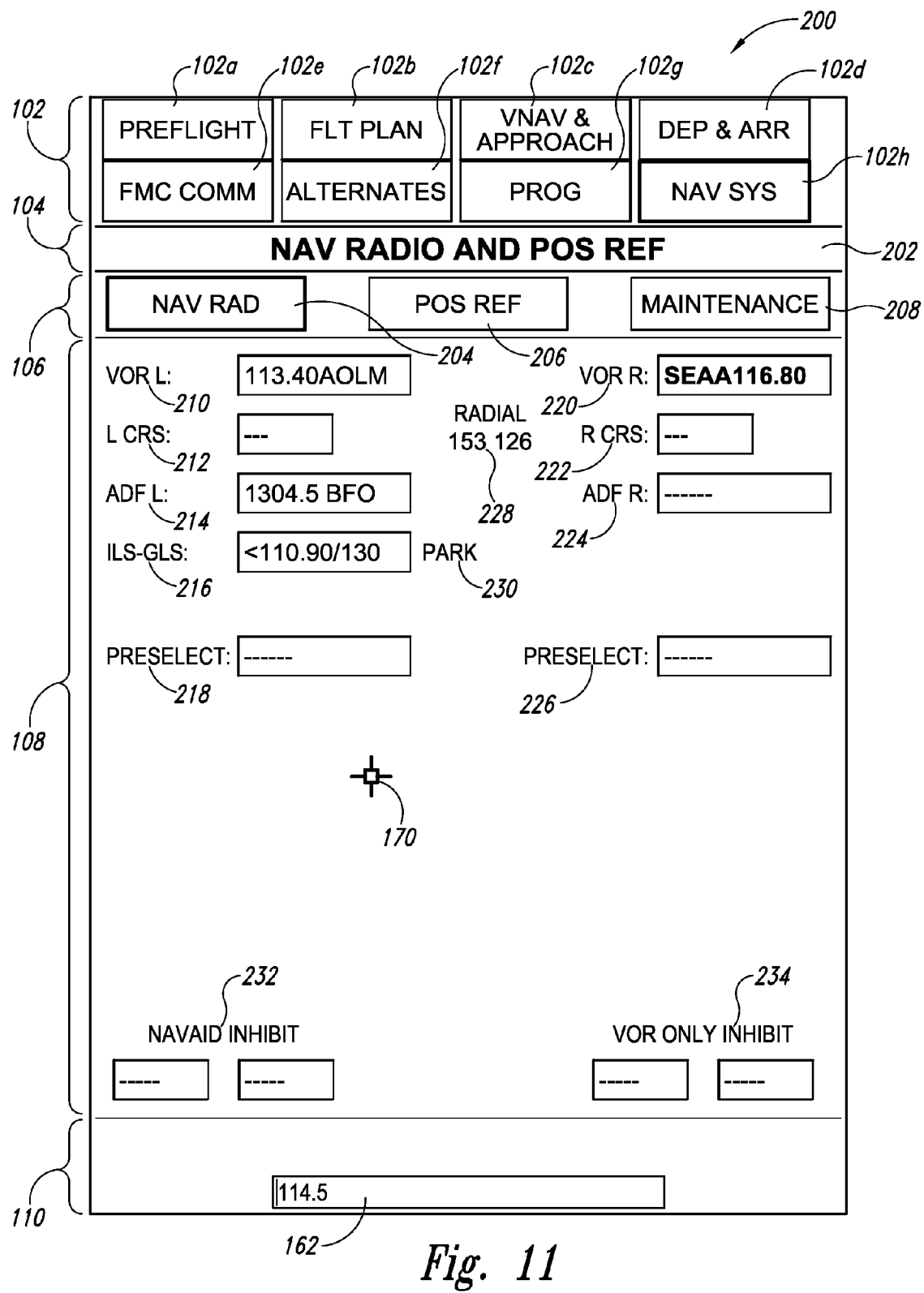
FIG. 11 is another example depicting the beginning of an interaction process entailing a data entry.
Figure 12:
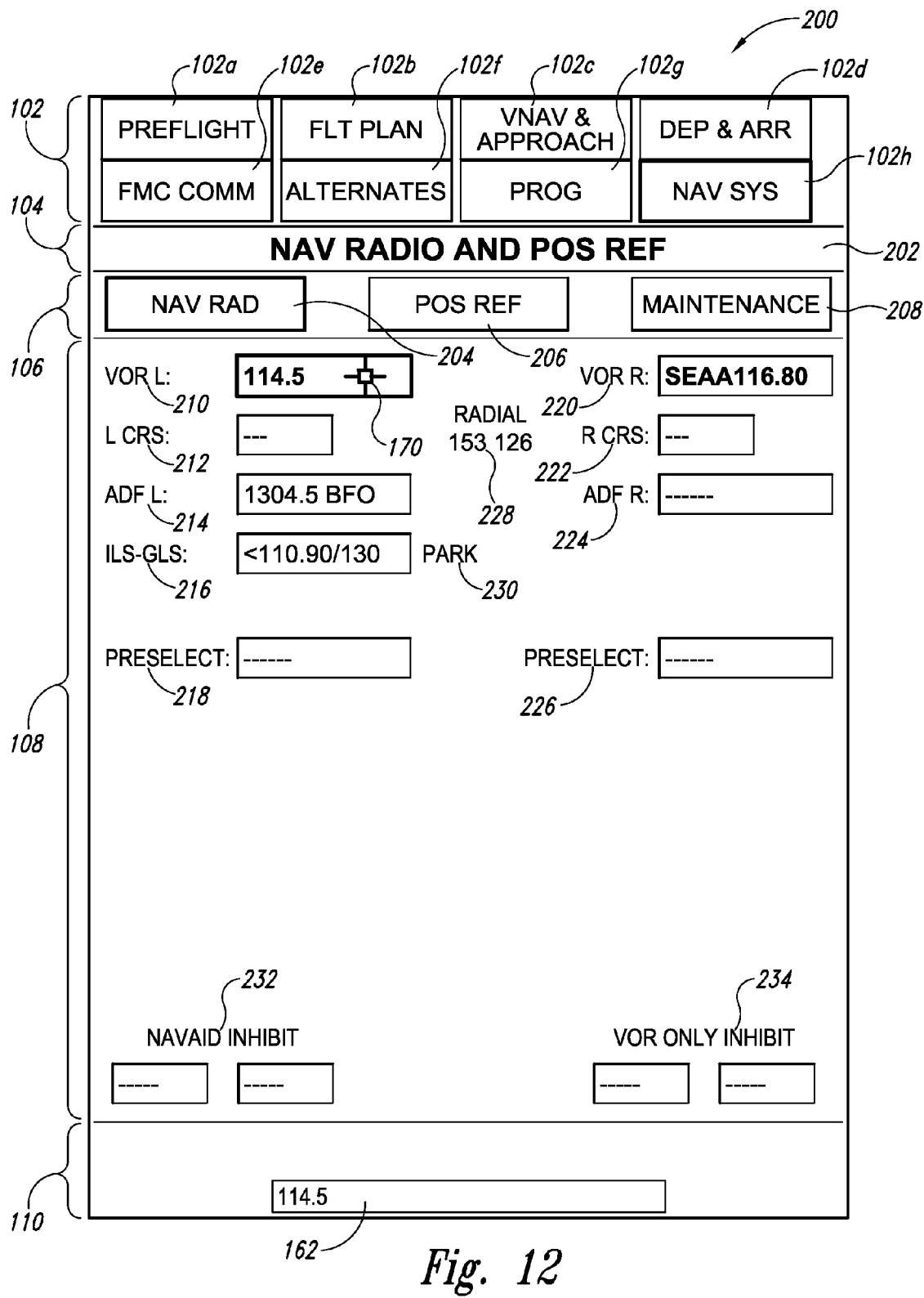
FIG. 12 shows an interaction step where the cursor is positioned over the target data field.
Figure 13:
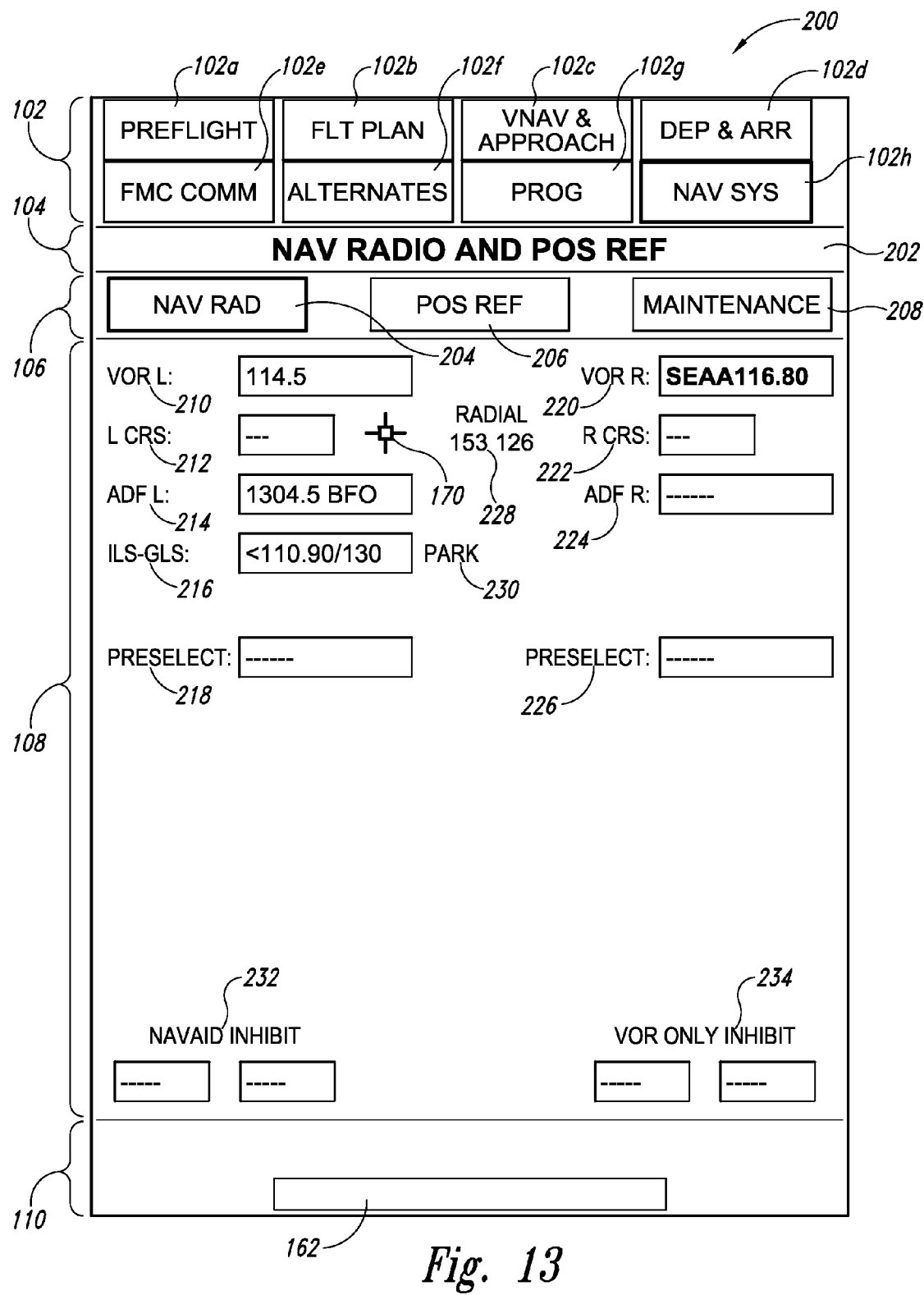
FIG. 13 shows a change in the target data field upon transfer of the data into the target data field.

Additional embodiments of the data handling aspects of this disclosure may also be implemented such as those shown in FIGS. 11-13. FIG. 11 depicts a navigation systems page 200 display where the pilot has selected the navigation systems 102h page. As a result, the second display portion 104 shows a different title of the displayed data, which in this case is "NAV RADIO and POS REF" 202.

The third display portion 106 of FIG. 11 provides a set of selectors, namely a navigation radio page selector 204; a position reference page selector 206; and a maintenance page selector 208.

FIG. 11's fourth display portion 108 entails the information related to radio navigation functions, which are known to those skilled in the relevant art. For example, shown in this display portion 108 are pilot-modifiable display fields such fields for tuning the left VOR 210; left course input field 212; left ADF input field 214; ILS/GLS input field 216; left preselect input field 218; right VOR input field 220, right course input field 222; right ADF input field 224; and right preselect input field 226. In addition, radial information 228 and PARK information 230 as well as NAVAID INHIBIT 232 and VOR ONLY INHIBIT 234 input fields are also provided.

Lastly, the fifth display portion 110 of FIG. 11 shows the scratchpad 162. The navigation systems page 200 depicts the start of a data handling interaction where the operator has typed "114.5" into the scratchpad 162 for entry into the "VOR L" field 210, which shows "113.40AOLM" as the current entry.

Unlike the embodiments of FIGS. 5-10, here the data string does not appear at the repeater 172 (not shown since in this embodiment there is no data to be repeated) next to the cursor 170. Instead, as shown in FIG. 12, when the operator positions the cursor 170 over the target data field VOR L 210 and prior to selecting it, the new data string is shown in preview form such as cyan text within the field, indicating what the final state will be if the operator selects it, by for example a mouse click. The data string continues to be shown in the scratchpad 162 further signifying that it has not yet been transferred to the target data field. As depicted in FIG. 13, after the operator has selected the target data field, the data string "114.5" is transferred to the field and it is no longer in the scratchpad 162.

By the way of a summary, it is important to note that the disclosed data handling capabilities handle information contained in a first (origin) data field or in a first area of a display that can be manipulated as a result of a "copy, cut, or paste" operation by repeating or attaching the data string to a cursor 170. When the operator positions the cursor 170 over a second (target) data entry field and selects it, the repeated string of characters is transferred or copied to the second data entry field.

Alternatively, the string of characters in the first data entry field may be temporarily shown in the target data entry field when the operator positions the cursor 170 over that field or touches that field to indicate what the value will be if the operator takes action to enter it into the target data entry field. That action may consist of selecting the field with the cursor or of lifting the finger from the display while positioned on the field. For touch input, if the operator wishes to cancel the entry, the operator may slide the finger off the field, at which point the temporarily shown data will disappear from the field and the field will return to its previous state.

Thus, by attaching the information to be transferred to the cursor 170 at the repeater 172 and/or by showing a preview of the transferred data in the intended entry field before the selection, the data handling means of this disclosure clarify and make visible what data is currently under manipulation. This reminds operators of where they are in a particular task and helps avoid potential errors with entering, copying, cutting, or pasting data from one display location to another display location.

The above detailed description of FIGS. 5-13 are intended to describe some embodiments but not the only embodiment of this disclosure, and in no way limit the scope of the disclosure. For example, the positioning of repeater 172 above the cursor 170 can be changed to be shown below the cursor 170. As another example, if the cursor 170 is positioned to be on the left end of the page, the repeater 172 may be shown to the right of the cursor 170 so as to remain visible to the operator. If the cursor 170 is positioned on an incorrect display field, the text string shown at the repeater 172 may be shown in a different color such that visual feedback of the need for adjustment or correction is provided to the operator.

Figure 14:
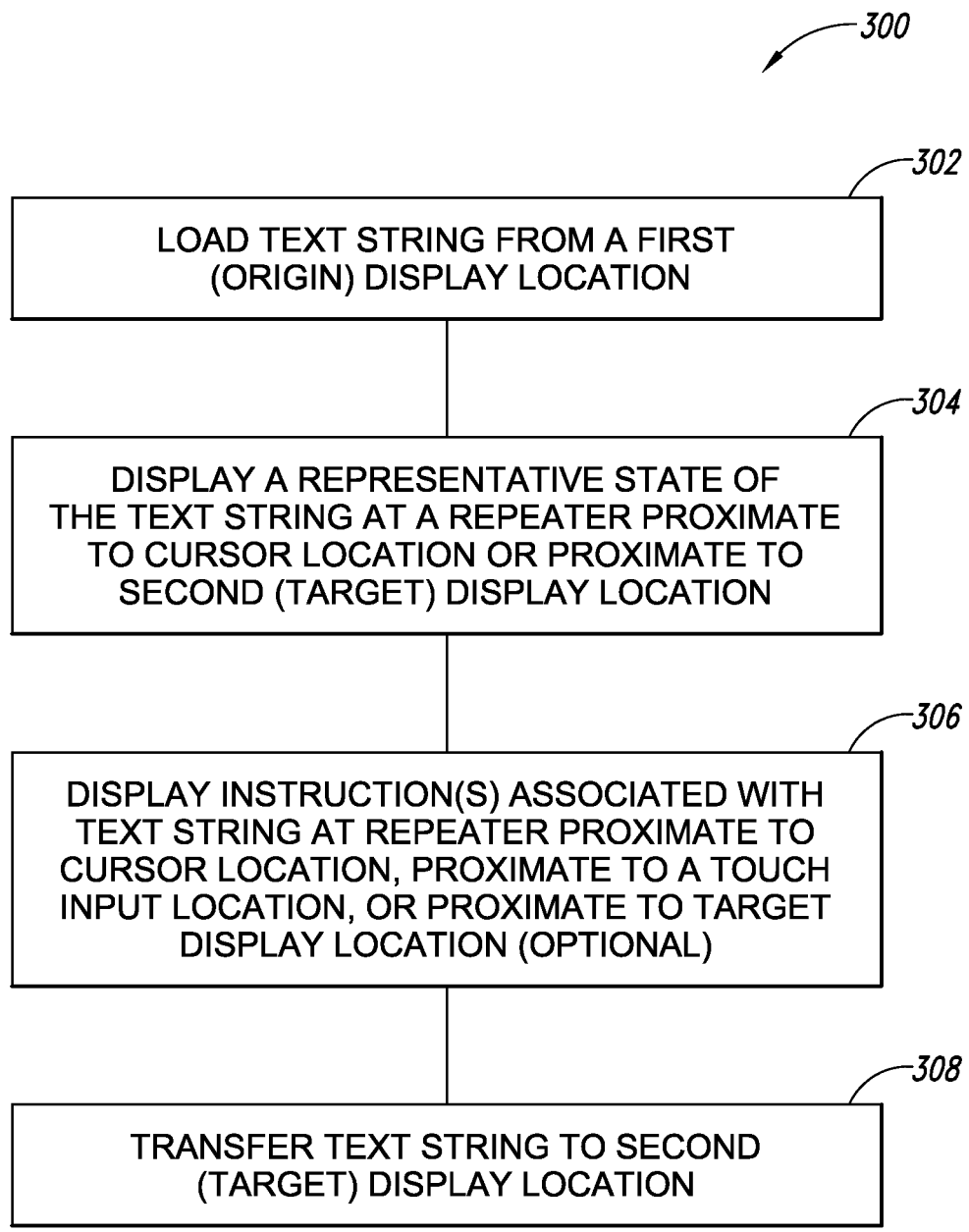
FIG. 14 is a flow chart of an example of a method by which an advantageous embodiment of the disclosure may be implemented.

FIG. 14 depicts a general method by which the disclosure may be implemented. The display of textual and graphical information on display systems such as those utilized by pilots in a modern aircraft display system, including the handling of certain information such as those associated with flight management, have been previously implemented in industry. Those skilled in the relevant art would understand how such display would be accomplished on aircraft systems, and that the depiction herein is one of several possible methods of displaying symbology.

It should be appreciated that the logical operations described herein are implemented (1) as a sequence of computer implemented acts or program modules running on a computing system such as a Flight Management Computer (FMC) and/or (2) as interconnected machine logic circuits or circuit modules within the computing system. The implementation is a matter of choice dependent on the performance and other requirements of the computing system. Accordingly, the logical operations described herein are referred to variously as steps, operations, or acts. These states, operations, or acts may be implemented in software, in firmware, in special purpose digital logic, and any combination thereof. It should also be appreciated that more or fewer operations may be performed than shown in the figures and described herein. These operations may also be performed in a different order than those described herein.

As will be appreciated by one skilled in the art, the present disclosure may be embodied as a method, system, apparatus, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and procedural programming languages, such as the "C" programming language or similar programming languages. The program code may execute entirely on the operator's computer, partly on the operator's computer, as a stand-alone software package, partly on the operator's computer and partly on a remote computer or entirely on the remote computer or server. In the latter scenario, the remote computer may be connected to the operator's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Now referring to FIG. 14, first, the method 300 loads 302 text from a first (origin) display location. Loading text may be carried out by either (1) loading the text from a button or icon such as described in the loading of "MADOW" text string in FIG. 5-9 or (2) loading the text that is typed onto the scratchpad 162 with an alphanumeric keyboard or keypad. The origin display location may be a data field or any text displayed at a display location on an aircraft display such as a CDU 96 and a Navigation Display 84. If the origin display location is the scratchpad 162, the scratchpad text may also be automatically loaded by the DHIS 12 as it is being entered via a keyboard or keypad by the operator.

Next, the method displays 304 a representative state of the loaded text string at a repeater 172 proximate to the cursor 170 location, proximate to a touch input location, or proximate to a target display location. The representative state of the text string may be identical to the loaded text string, an abbreviated (e.g., short form, shorthand, airline-specific, or regional syntax such as two-letter versus three-letter airline codes) but valid form of the text string, or a reformatted form of the text string wherein the reformatting has been done to suit one or more target display locations. The step for reformatting the text string or for identifying and validating target display locations can be accomplished by the DHIS 12, via for example, system-based data format comparison checks. In this step, when displayed proximate to a target display location, or preferably at the target display location, the representative state of the text string is displayed in temporary or preview mode. The preview (temporary) mode of the text string is shown in a different text color, text size, and/or text font from the permanent (non-preview) mode to better indicate to the pilots the current phase of the data handling step.

With regard to modes of display of the representative state of the text string, those skilled in the relevant art understand the text string can be generally displayed in a differentiated manner—such as a first manner with a certain color, size, and font, and a second manner different from the first manner with another color, size, and font—as a function of inputs such as but not limited to the location of the cursor in the display, the current step in the data handling operation, or even to indicate the validity of the text string syntax or completeness of the text string.

Optionally, and responsive to operator input or a set wait time (e.g., a time-based or time input), the method may display 306 instruction(s) associated with the text string at the repeater 172 proximate to the cursor 170 location or proximate to the target display location. The instruction(s) may be in lieu of the text string under manipulation or may be adjacent to the text string such as in a pop-up window in a manner such as disclosed in U.S. Pat. No. 7,751,947.

Lastly, the method loads or transfers 308 the text string to take effect at the second (target) display location. After the text string is loaded on to the second display location, the operator may proceed to utilize the loaded information by activating or executing one or more functions which use the content of the second display location as input. In this step, when displayed at the target display location, the representative state of the text string is displayed in permanent (non-preview) mode. The permanent (non-preview) mode of the text string is shown in a different text color, text size, and/or text font from the preview mode to better indicate to the pilots the completion of the current data handling effort.

Those skilled in the relevant art will appreciate that the above method may be implemented in the DHIS 12. For example and without limitation, one embodiment is a non-transitory computer readable medium containing instructions for handling data at an aircraft display by a method comprising: accepting a text string for storage in memory; storing the text string in memory; displaying the text string at a repeater 172 coupled to a cursor 170 of a cursor control device; displaying the text string at a target display location in preview mode when the cursor 170 is positioned within the target display location; and responsive to an operator input or a system input, transferring the text string to the target display location in permanent mode.

It is important to note that aspects of the method can be made to be context-sensitive. Those skilled in the relevant art understand how to apply context sensitivity to the embodiments disclosed above. General examples of the range of options for context-sensitive embodiments include DHIS 12 system-based checks such as system data checks; checking the data under operator handling for syntax; tracking the preceding or current steps in the data handling operation; tracking the origin and destination display locations; and removing data at the repeater when switching pages or display window if the data is not applicable to the new page or display window.

Other embodiments within the ambit of context-sensitivity implementations of this disclosure include options for clearing the text string stored in memory or shown at the repeater after a time certain if the operator does not take a next step such as placing the cursor at a potential target display location. Further distinct embodiments also include options for activating or transferring the text string stored in memory, shown at the repeater 172, or in preview mode after a time certain if the operator has placed the cursor at a potential target display location and the system data checks are valid such that the DHIS 12 can automatically activate or transfer the text string to the target display location.

Yet further distinct embodiments of context-sensitivity include highlighting or otherwise indicating one or more target display locations for the particular text string stored in memory or shown at the repeater 172. In this embodiment, a DHIS 12 with capabilities to perform one or more of the range of options for context-sensitivity discussed above such as syntax checks, the preceding or current steps in the data handling operation, or even the phase of flight to which the data handling operation applies, can be enabled to automatically highlight or indicate a target display location to which the text string may be transferred. The DHIS 12 may also be enabled to automatically make unavailable display locations which are not valid for the text string under handling by making them not selectable or non-activatable display elements or otherwise showing them in un-highlighted mode. For example, in the example above of FIGS. 5-9 where waypoint string "MADOW" was under manipulation, only the fields under the column header for waypoints 106b would be highlighted. In this regard, the DHIS 12 not only provides continuous feedback as to the current state of the data handling operation, but also guides the pilot to potentially applicable or correct target display locations.

The disclosed embodiments may also feature context-sensitive embodiments of assistance or instruction messages. For example, if the repeater 172 has a text string that has multiple potential target display locations, a right click on a cursor control device or a gesture on a touch screen may cause options, instructions or assistance messages to be displayed in a pop-up mode or as an adjacent box proximate to the cursor 170 or the location of the finger. The assistance or instruction messages may be tailored or variably matched—that is, to arrange or to order the one or more potentially applicable messages according to their effect upon activation or transfer of the text string to the target display location—to suit the one or more target locations to which the text string under manipulation applies. Alternatively, the assistance or instruction message may be tailored or variably matched to apply to the target display location at which the cursor 170 or touch input is located. If the cursor 170 or touch input is moved to a different target field, the instruction or assistance message may be changed to a suitable message for the new target field. In addition to the aforementioned advantages of the various embodiments, this kind of context-sensitive embodiment better helps direct the operator to focus on the current task and the pending data handling step associated with the current task.

The subject matter described above is provided by the way of illustration only and should not be construed as limiting. While preferred embodiments have been described above and depicted in the drawings, other depictions of data tags and graphics symbology can be utilized in various embodiments of the disclosure. Graphical symbology may be used in place of text-based indications. Measurement units such as feet, meters, or miles may be suitably changed as appropriate for the task, custom, or convention. Lastly, the nomenclature, color, and geometric shape of the display elements can be varied without departing from the scope of the disclosure as defined by the appended claims.

We claim:

1. A cockpit data handling device operatively coupled to an aircraft display, comprising:
    means for loading a text string into memory from an origin display location for operator handling;
    means for displaying a representative state of the text string under operator handling proximate to a cursor and a scratchpad location;
    responsive to a system check of the text string, means for indicating one or more valid target display locations for the text string;
    means for transferring the text string to the one or more valid target display locations; and
    responsive to transferring the text string to the one or more valid target display locations, means for removing the representative state of the text string proximate to the cursor and the scratchpad location.

2. The device of claim 1 further comprising, responsive to a set wait time, means for displaying at least one instruction associated with the text string proximate to the cursor.

3. The device of claim 1 further comprising, responsive to a set wait time, means for clearing the text string from memory.

4. The device of claim 1, further comprising, responsive to a set wait time, means for displaying at least one instruction proximate to the one or more valid target display locations.

5. The device of claim 1 further comprising, responsive to the location of the cursor on the aircraft display, means for displaying in preview mode a representative state of the loaded text string at the one or more valid target display locations.

6. A cockpit data handling system operatively coupled to an aircraft display, comprising:
a cursor-control device coupled to an aircraft display;
a repeater coupled to a cursor of the cursor control device, wherein the repeater displays a representative state of a text string under operator handling;
a scratchpad for simultaneously displaying the representative state of the text string; and
an activator for performing a system check of the text string, indicating one or more valid target display locations for the text string, transferring the text string to the one or more target display locations, and responsive to transferring the text string to the one or more valid target display locations, removing the representative state of the text string from the repeater and the scratchpad.

7. The system of claim 6 wherein the repeater displays the representative state of the text string in a first manner when the cursor is over a valid target display location and displays the representative state of the text string in a second manner when the cursor is outside a valid target display location, the second manner being different from the first manner.

8. The system of claim 6 wherein the activator accepts operator input selected from one of a cursor control device click, a touch input, a keyboard input, and a keypad input.

9. The system of claim 6 wherein the repeater displays at least one instruction associated with the text string proximate to a valid target display location wherein the at least one instruction is variably matched to indicate the effect of the text string activation at the valid target display location.

10. The system of claim 6 further comprising a previewer wherein the previewer, responsive to a location of the cursor on the aircraft display, displays the representative state of the text string at the one or more valid target display locations.

11. The system of claim 10 further wherein the previewer displays the representative state of the text string in a first manner when the cursor is over a valid target display location and displays the representative state of the text string in a second manner when the cursor is outside a valid target display location, the second manner being different from the first manner.

12. The system of claim 10 further wherein the previewer displays at least one instruction associated with the text string proximate to a valid target display location wherein the at least one instruction is variably matched to indicate the effect of the text string activation at the valid target display location.

13. A method of handling data on an aircraft, comprising:
responsive to a first operator input, loading a text string into memory from an origin display location;
displaying a representative state of the text string at a repeater proximate to a cursor location and a scratchpad location;
responsive to a second operator input or a system input, displaying instructions associated with the text string at the repeater proximate to the cursor location;
responsive to a system check of the text string, indicating one or more valid target display locations for the text string; and
responsive to a third operator input or a system input, transferring the text string to the one or more valid target display locations and removing the representative state of the text string proximate to the cursor and the scratchpad location.

14. The method of claim 13 further comprising displaying a representative state of the text string in preview mode at the one or more valid target display locations.

15. The method of claim 13 further comprising displaying instructions associated with the text string at one of the target display location and a touch input location.

16. The method of claim 13 further comprising, responsive to a set wait time, displaying at least one instruction proximate to the one or more valid target display locations.

17. The method of claim 13 further comprising, responsive to a set wait time, clearing the text string from memory.

18. A non-transitory computer readable medium containing instructions for handling data at an aircraft display by a method comprising:
accepting a text string for storage in memory;
storing the text string in memory;
displaying the text string at a scratchpad location and a repeater coupled to a cursor of a cursor control device, wherein the scratchpad and the repeater display a representative state of the stored text string;
responsive to a system check of the text string, indicating one or more valid target display locations for the text string;
displaying the text string at the one or more valid target display locations in preview mode when the cursor is positioned within the one or more valid target display locations; and
responsive to an operator input or a system input, transferring the text string to the one or more valid target display locations in permanent mode and removing the representative state of the text string from the repeater and the scratchpad location.

19. The computer readable medium of claim 18 further comprising, responsive to a set wait time, displaying at least one instruction proximate to the one or more valid target display locations.

* * * * *